| United States Patent [19] | [11] Patent Number: 4,938,925 |
| Petersen et al. | [45] Date of Patent: Jul. 3, 1990 |

[54] METHOD OF INHIBITING CORROSION USING N-S CONTAINING COMPOUNDS

[75] Inventors: Philip R. Petersen, Houston; Larry G. Coker, La Porte; Daniel S. Sullivan, III, Houston, all of Tex.

[73] Assignee: Exxon Chemical Patents, Inc., Linden, N.J.

[21] Appl. No.: 191,929

[22] Filed: May 9, 1988

[51] Int. Cl.$^5$ .................... E21B 41/02; C23F 11/10
[52] U.S. Cl. .................................. 422/12; 252/8.555; 252/391; 422/7
[58] Field of Search ................ 252/8.555, 391; 422/12

[56] References Cited

U.S. PATENT DOCUMENTS

| 3,634,270 | 1/1972 | Engle et al. | 422/12 |
| 3,932,296 | 1/1976 | Blythe | 252/148 |
| 3,992,313 | 11/1976 | Anderson et al. | 252/149 |
| 4,446,056 | 5/1984 | Thompson | 252/8.555 |
| 4,536,302 | 8/1985 | Augsburger et al. | 252/8.551 |
| 4,557,838 | 12/1985 | Nichols et al. | 252/8.555 |
| 4,613,481 | 9/1986 | Gill et al. | 422/16 |
| 4,673,436 | 6/1987 | Haslegrave et al. | 252/391 |
| 4,784,779 | 11/1988 | Dadgar | 252/8.551 |

*Primary Examiner*—John F. Terapane
*Assistant Examiner*—Gary L. Geist
*Attorney, Agent, or Firm*—Robert L. Graham; John F. Hunt

[57] ABSTRACT

A method of inhibiting corrosion of metal equipment in wells comprises contacting the metal surfaces with an inhibiting amount of a corrosion inhibitor which is the reaction product of a compound containing a carbonyl group (e.g. aldehydes), an amine, and a thiocyanate.

14 Claims, No Drawings

METHOD OF INHIBITING CORROSION USING N-S CONTAINING COMPOUNDS

BACKGROUND OF THE INVENTION

The present invention relates to a method of inhibiting corrosion, particularly in oil field producing equipment. In one aspect, the method of the present invention employs a compound containing sulfur and nitrogen.

Wells producing from subterranean formations frequently produce high concentrations of salt water which present a severe corrosion problem, particularly at temperatures above 250° F. Corrosion is further increased with the presence of oxygen, carbon dioxide, hydrogen sulfide and/or organic and inorganic acids.

Nitrogen containing compounds are known to act as corrosion inhibitors. For example, various amines are effective to inhibit corrosion. A number of patents disclose corrosion inhibitors containing sulfur and/or nitrogen, e.g., sulfur - U.S. Pat. Nos. 3,809,655, 3,759,956, 3,755,176, 3,158,476, 2,880,180, 3,404,094, 3,197,403, 3,969,414; nitrogen - 3,445,441, 3,450,646, 3,976,593; sulfur and nitrogen - 3,414,521, 4,450,138.

U.S. Pat. No. 4,450,138, for example, discloses among other things, the reaction of thiols with epichlorohydrin followed by the reaction with amines.

U.S. Pat. No. 4,446,056 discloses S containing compositions prepared by reacting hexahydrotriazines, in the presence of a Lewis acid, with S or S containing compounds.

U.S. Pat. No. 4,673,436 discloses the use of a thio substituted quaternary ammonium salt.

There are several patents which disclose the use of N-S containing compounds for use as corrosion inhibitors in pickling operations. Pickling is a process for the removal of scale, oxides, and other impurities from metal surfaces by immersion into an inorganic acid. U.S. Pat. Nos. 2,425,320, 2,586,331, 2,606,155 are representatives of pickling inhibition patents. However, there is no teaching in these references that the N-S compounds are effective in inhibiting corrosion of oil field producing equipment.

Other U.S. Patents which disclose corrosion inhibitors include U.S. Pat. Nos. 3,634,270, 3,969,255, and 4,536,302. These references, however, do not disclose the corrosion inhibitors of the present invention.

SUMMARY OF THE INVENTION

It has surprisingly been discovered that a corrosion inhibitor prepared by the reaction of a carbonyl compound, an amine, and a thiocyanate provides exceptional protection against ferrous corrosion in severe environments. The method of the present invention, thus, involves the use of from 1 to 10,000, (preferably 1 to 1,000, and more preferably 1 to 500) wt ppm of the improved corrosion inhibitor based on the weight of the fluid treated.

The three components of the improved corrosion inhibitor may be reacted simultaneously or in any order. Preferably the mole ratio is from 1 to 2 moles each of the other two components.

The preferred carbonyl containing compound is selected from mono- and polyfunctional aldehydes and ketones, with monoaldehydes being the more preferred. The preferred amine is selected from monoamines and polyamines with alkyl monoamines being more preferred. The preferred thiocyanate is ammonioum thiocyanate.

The improved corrosion inhibitor is preferably employed in wells producing both oil and water and in high temperature environments (250° F.). The improved inhibitor may be injected into the crude stream by conventional equipment and techniques.

DESCRIPTION OF THE PREFERRED EMBODIMENTS

As mentioned previously, the improved corrosion inhibitor of the present invention is the reaction product of three compounds: (a) a carbonyl compound, (b) an amine, and (c) a thiocyanate.

The preferred carbonyl compounds are alkyl or aryl aldehydes and ketones. Alkyl and aryl aldehydes include $C_1$–$C_{18}$ aldehydes, oiticia, benzaldehydes, substituted benzaldehydes, glutareldehyde, and glyoxyl, with formaldehyde to butanal being preferred. Alkyl and aryl ketones include acetone, methyl ethyl ketone, methyl isobutyl ketone, 2- and 3-hexanones, cyclohexanone and acylated aromatics such as acetophenone, propiophenone, butyrophenone, and salicylaldehyde. The preferred aldehydes are $C_1$–$C_6$ aldehydes with formaldehyde being the most preferred.

The amines useable to prepare the improved corrosion inhibitor include ammonia, primary and secondary and mono-and polyamines. The substituted hydrocarbon radical may be aliphatic (saturated or unsaturated), alicyclic, aromatic, heterocyclic, or combinations of these. The amines have the following formula

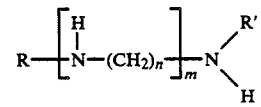

where R and R' are each H or $C_1$ to $C_{18}$ alkyl or aryl groups and are the same or different; n=2–3; and m=0–4.

The preferred amines are $C_2$–$C_{18}$ alkyl monoamines.

The thiocyanates include alkyl and aryl thiocyanates and ammonium thiocyanate, with the latter being preferred.

Preparation Of The Corrosion Inhibitor

There are a number of ways for preparing the reaction product of the three components described above. The thiocyanate may be mixed with the amine in an appropriate solvent which then may be reacted with the aldehyde at sufficient reaction temperature. Alternatively, the aldehyde may be reacted with the amine followed by reacting the intermediate with the thiocyanate in an appropriate solvent with the application of heat. Also the three components may be mixed in an appropriate solvent and reacted simultaneously at reaction temperatures.

The mole ratio of the reactants may vary within a rather wide range but the preferred ratio ranges are as follows:

| | Mole Ratio Range | Preferred Mole Ratio Range |
|---|---|---|
| (a) Carbonyl compound | 0.5–3.0 | 1.0–2.0 |
| (b) amine | 0.5–3.0 | 1.0–2.0 |
| (c) thiocyanate | 0.5–3.0 | 1.0–2.0 |

Thus in the preferred ranges the components (a):(b):(c) include the following combination 1:1:1, 1:1:2; 1:2:1; 2:1:1; 1:2:2; 2:1;2; and 2:2:1.

The corrosion inhibitor useful in the method of the present invention may be prepared by any of the following methods. One Step Method: The appropriate amounts of the selected amine, carbony-containing compound and thiocyanate are mixed together in a solvent such as xylene and heated to reflux. The water of reaction is removed by azeotropic distillation. After one to six hours at reflux, the reaction mixture is cooled to room temperature. The reaction product can be isolated by evaporation of the solvent or the product can be used in the aromatic solvent or it can be blended with other materials. Two Step Method: The appropriate amounts of the selected amine and carbonyl-containing compound are mixed together in a solvent such as xylene and heated to reflux. The water of reaction is removed by azeotropic distillation. After the theoretical amount of water has been collected, the reaction mixture is cooled and the thiocyanate is added. The mixture is then heated to reflux again for one to six hours, cooled to room temperature and worked up as described in the One Step Method. Three Step Method: The appropriate amounts of the selected amine and carbonyl-containing compound are mixed together in a solvent such as xylene and heated to about 60 degrees C. and held at this temperature for 20 to 120 minutes. The mixture is then heated to reflux and the water of reaction is removed azeotropically. After the theoretical amount of water has been collected, the reaction mixture is cooled and the thiocyanate is added. The mixture is then heated to reflux again for one to six hours, cooled to room temperature and worked up as described above.

All of the reactions can be done by any of the three Methods and the resulting reaction products provide substantially the same corrosion protection. However, each Method can be used to special benefit for certain reactants. The Three Step Method is especially useful when either the amine or aldehyde has a low boiling point and/or is in an aqueous or alcoholic solution. The reaction period at about 60 degrees C. allows the initial reaction of amine and aldehyde (to form the Schiff base) to proceed without the loss of either reactant. The Two Step Method was generally used because it allows the reaction to go through a known intermediate and also, if the formation of the Schiff base is incomplete for some reason, this lack of reaction can be readily detected because less than the theoretical amount of water will be liberated in the first step and, if this happens, the reaction can be terminated at that point. The One Step Method is physically and mechanically the easiest of the three Methods.

EXPERIMENTS

Samples were prepared by all three Methods described above and tested for corrosion inhibition performance in both dynamic tests (wheel test) and static tests. Table I presents the composition of some of the samples prepared and tested.

TABLE I

| Sample No. | Amine | Carbonyl compound | X-SCN X= | Mole Ratio |
|---|---|---|---|---|
| 1 | ammonia | formaldehyde | NH4 | 1:1:1 |
| 2 | ammonia | propionaldehyde | NH4 | 1:1:1 |
| 3 | ammonia | butyraldehyde | NH4 | 1:1:1 |
| 4 | ammonia | butyraldehyde | NH4 | 2:1:1 |
| 5 | ammonia | butyraldehyde | NH4 | 1:2:1 |
| 6 | ammonia | octyl aldehyde | NH4 | 1:1:1 |
| 7 | ammonia | octyl aldehyde | NH4 | 2:1:1 |
| 8 | ammonia | octyl aldehyde | NH4 | 1:2:1 |
| 9 | ammonia | decyl aldehyde | NH4 | 1:1:1 |
| 10 | ammonia | dodecyl aldehyde | NH4 | 1:1:1 |
| 11 | butyl | formaldehyde | NH4 | 1:1:1 |
| 12 | butyl | butyraldehyde | NH4 | 1:1:1 |
| 13 | ethylene diamine | salicylaldehyde | NH4 | 1:1:1 |
| 14 | butyl | octyl aldehyde | NH4 | 1:1:1 |
| 15 | octadecyl | acetone | NH4 | 1:1:1 |
| 16 | ethylene diamine | oiticia oil | NH4 | 1:1:1 |
| 17 | octyl | formaldehyde | NH4 | 1:1:1 |
| 18 | octyl | butyraldehyde | NH4 | 1:1:1 |
| 19 | octyl | octyl aldehyde | NH4 | 1:1:1 |
| 20 | octyl | octyl aldehyde | Na | 1:1:1 |
| 21 | dodecyl | formaldehyde | NH4 | 1:1:1 |
| 22 | dodecyl | butyraldehyde | NH4 | 1:1:1 |
| 23 | dodecyl | octyl aldehyde | NH4 | 1:1:1 |
| 24 | coco | formaldehyde | NH4 | 1:1:1 |
| 25 | coco | formaldehyde | NH4 | 2:1:1 |
| 26 | coco | formaldehyde | NH4 | 1:2:1 |
| 27 | coco | propionaldehyde | NH4 | 1:1:1 |
| 28 | coco | butyraldehyde | NH4 | 1:1:1 |
| 29 | coco | butyraldehyde | NH4 | 2:1:1 |
| 30 | coco | butyraldehyde | NH4 | 1:2:1 |
| 31 | coco | hexyl aldehyde | NH4 | 1:1:1 |
| 32 | coco | octyl aldehyde | NH4 | 1:1:1 |
| 33 | coco | octyl aldehyde | NH4 | 2:1:1 |
| 34 | coco | octyl aldehyde | NH4 | 1:2:1 |
| 35 | coco | dodecyl aldehyde | NH4 | 1:1:1 |
| 36 | octadecyl | formaldehyde | NH4 | 1:1:1 |
| 37 | octadecyl | butyraldehyde | NH4 | 1:1:1 |
| 38 | octadecyl | octyl aldehyde | NH4 | 1:1:1 |
| 39 | tallow | formaldehyde | NH4 | 1:1:1 |
| 40 | tallow | butyraldehyde | NH4 | 1:1:1 |
| 41 | tallow | octyl aldehyde | NH4 | 1:1:1 |
| 42 | tallow | octyl aldehyde | NH4 | 2:1:1 |
| 43 | tallow | octyl aldehyde | NH4 | 1:2:1 |
| 44 | oleyl | formaldehyde | NH4 | 1:1:1 |
| 45 | oleyl | butyraldehyde | NH4 | 1:1:1 |
| 46 | oleyl | octyl aldehyde | NH4 | 1:1:1 |
| 47 | ethylene diamine | butyraldehyde | NH4 | 1:1:1 |
| 48 | ethylene diamine | butyraldehyde | NH4 | 1:2:1 |
| 49 | ethylene diamine | butyraldehyde | NH4 | 1:2:2 |
| 50 | ethylene diamine | octyl aldehyde | NH4 | 1:1:1 |
| 51 | ethylene diamine | octyl aldehyde | NH4 | 1:2:1 |
| 52 | ethylene diamine | octyl aldehyde | NH4 | 1:2:2 |
| 53 | diethylene triamine | butyraldehyde | NH4 | 1:1:1 |
| 54 | diethylene triamine | butyraldehyde | NH4 | 1:2:2 |
| 55 | diethylene triamine | butyraldehyde | NH4 | 1:3:3 |
| 56 | diethylene triamine | octyl aldehyde | NH4 | 1:1:1 |
| 57 | diethylene triamine | octyl aldehyde | NH4 | 1:2:2 |
| 58 | diethylene triamine | octyl aldehyde | NH4 | 1:3:3 |
| 59 | coco diamine | butyraldehyde | NH4 | 1:1:1 |
| 60 | coco diamine | butyraldehyde | NH4 | 1:2:1 |
| 61 | coco diamine | butyraldehyde | NH4 | 1:2:2 |
| 62 | coco diamine | octyl aldehyde | NH4 | 1:1:1 |
| 63 | coco diamine | octyl aldehyde | NH4 | 1:2:1 |
| 64 | coco diamine | octyl aldehyde | NH4 | 1:2:2 |
| 65 | tallow | butyraldehyde | NH4 | 1:1:1 |

TABLE I-continued

| Sample No. | Amine | Carbonyl compound | X-SCN X= | Mole Ratio |
|---|---|---|---|---|
| 66 | diamine tallow diamine | butyraldehyde | NH4 | 1:2:1 |
| 67 | tallow diamine | butyraldehyde | NH4 | 1:2:2 |
| 68 | tallow diamine | octyl aldehyde | NH4 | 1:1:1 |
| 69 | tallow diamine | octyl aldehyde | NH4 | 1:2:1 |
| 70 | tallow diamine | octyl aldehyde | NH4 | 1:2:2 |
| 71 | butyl | glyoxal | NH4 | 1:1:1 |
| 72 | butyl | glyoxal | NH4 | 1:1:2 |
| 73 | butyl | glyoxal | NH4 | 2:1:1 |
| 74 | butyl | glyoxal | NH4 | 2:1:2 |
| 75 | butyl | glutaraldehyde | NH4 | 1:1:1 |
| 76 | butyl | glutaraldehyde | NH4 | 2:1:1 |
| 77 | butyl | glutaraldehyde | NH4 | 2:1:2 |
| 78 | octyl | glyoxal | NH4 | 1:1:1 |
| 79 | octyl | glyoxal | NH4 | 2:1:1 |
| 80 | octyl | glyoxal | NH4 | 2:1:2 |
| 81 | octyl | glutaraldehyde | NH4 | 1:1:1 |
| 82 | octyl | glutaraldehyde | NH4 | 2:1:1 |
| 83 | octyl | glutaraldehyde | NH4 | 2:1:2 |
| 84 | coco | glyoxal | NH4 | 1:1:1 |
| 85 | coco | glyoxal | NH4 | 2:1:1 |
| 86 | coco | glyoxal | NH4 | 2:1:2 |
| 87 | coco | glutaraldehyde | NH4 | 1:1:1 |
| 88 | coco | glutaraldehyde | NH4 | 2:1:1 |
| 89 | coco | glutaraldehyde | NH4 | 2:1:2 |
| 90 | butyl | acetone | NH4 | 1:1:1 |
| 91 | octyl | cyclohexanone | NH4 | 1:1:1 |

High Temperature and Pressure Tests

The high temperature and pressure tests were run in 50 ml and 500 ml pressure containers. Temperatures tested were from 250 to 350 degrees F.; oil/water ratios were from 0 to 0.5; the salinity of the brine (as sodium chloride) ranged from 0 to 25 wt %. Corrosive gases were hydrogen sulfide and/or carbon dioxide at mole fractions of up to 0.4 for each gas (balance being methane); the total pressures in the system were from 1000 to 4000 psig at ambient temperature. The pressure containers with corrosion coupons inserted therein were rotated in a heated oven for about 24 hours. At the end of each test, the coupons were removed, cleaned and weighed.

Representative, but not exclusive, conditions under which many of the corrosion inhibitors were tested include: Test Series A:
Temperature=260 degrees F.
Brine comp.=25% NaCl
Oil/water=0
Gas mixture=16% $H_2S$, 3% $CO_2$, 81% $CH_4$
Total pres.=1250 psig
Test Series B:
Temperature=430 degrees F.
Brine comp.=20% NaCl
Oil/water=0
Gas mixture=10% $H_2S$, 4% $CO_2$, 86% $CH_4$
Total pres.=2000 psig
Test Series C:
Temperature=350 degrees F.
Brine comp.=5% NaCl
Oil/water=1/9
Gas mixture=10% $H_2S$, 10% $CO_2$, 80% $CH_4$
Total pres.=1000 psig
Test Series D:
Temperature=295 degrees F.
Brine comp.=0% NaCl
Oil/water=0
Gas mixture=4% $H_2S$, 6% $CO_2$, 90% $CH_4$
Total pres.=2000 psig
Test Series E:
Temperature=290 degrees F.
Brine comp.=0% NaCl
Oil/water=0
Gas mixture=21% $H_2S$, 40% $CO_2$, 39% $CH_4$
Total pres.=950 psig Under each test, the corrosion inhibitor, unless otherwise indicated, was used at a concentration of 250 ppm actives based on the total weight of the liquids. Each test was run in duplicate. Table II presents representative test results.

TABLE II

| Test Cond. | Sample No. | Ave. weight loss (mg) | Test Cond. | Sample No. | Ave. weight loss (mg) |
|---|---|---|---|---|---|
| A | blank | 115 | B | blank | 157 |
|  | 11 | 53 |  | 11 | 62 |
|  | 24 | 55 |  | 36 | 36 |
|  | 25 | 42 |  | 38 | 39 |
|  | 26 | 45 |  | 24 | 59 |
|  | 36 | 22 |  | 25 | 63 |
|  | 38 | 30 |  | 26 | 59 |
|  | 39 | 42 |  |  |  |
| C | blank | 119 | D | blank | 92 |
|  | 3 | 50 |  | 11 | 8 |
|  | 6 | 30 |  | 24 | 7 |
|  | 11 | 72 |  | 25 | 18 |
|  | 17 | 30 |  | 26 | 20 |
|  | 19 | 45 |  | 28 | 6 |
|  | 24 | 25 |  | 36 | 7 |
|  | 35 | 35 |  | 39 | 6 |
|  | 36 | 12 |  |  |  |
|  | 37 | 35 |  |  |  |
|  | 38 | 40 |  |  |  |
| E | blank | 80 |  |  |  |
|  | 11 | 44 |  |  |  |
|  | 24 | 11 |  |  |  |
|  | 25 | 9 |  |  |  |
|  | 26 | 25 |  |  |  |
|  | 36 | 15 |  |  |  |
|  | 38 | 13 |  |  |  |
|  | 39 | 10 |  |  |  |

Wheel Tests

Wheel tests consisted of the following: The brine and hydrocarbon liquids were saturated with the corrosive gas by bubbling the gas therethrough. In the case of gas mixtures, a saturated solution of hydrogen sulfide in brine was added to a brine saturated with carbon dioxide to produce the desired ratio of gases. The inhibitor was added (at 100 ppm based on total fluids unless otherwise noted), a metal coupon was inserted into the bottle, the bottle capped and placed on a "wheel" in an oven at the selected temperature. The "wheel" was rotated at 30 rpm for 24 hours. At the end of the test period, the coupons were removed, cleaned and weighed.
Test Series AA:
Temperature=200 degrees F.
Brine comp.=3% NaCl
Oil/water=0
Corrosives=saturated $H_2S$
Test Series BB:
Temperature=200 degrees F.
Brine comp.=205 NaCl
Oil/water=0

Corrosives=saturated H2S
Test Series CC:
Temperature=200 degrees F.
Brine comp.=20% NaCl
Oil/water=1/19
Corrosives=saturated H2S
Test Series DD:
Temperature=200 degrees F.
Brine comp.=3% NaCl
Oil/water=0
Corrosives=saturated $CO_2$+500 ppm $H_2S$
Test Series EE:
Temperature=200 degrees F.
Brine comp.=20% NaCl
Oil/water=0
Corrosives=saturated $CO_2$+500 ppm $H_2S$
Test Series FF:
Temperature=200 degrees F.
Brine comp.=3% NaCl
Oil/water=0
Corrosives=saturated $CO_2$
Test Series GG:
Temperature=200 degrees F.
Brine comp.=20% NaCl
Oil/water=0
Corrosives=saturated $CO_2$
Test Series HH:
Temperature=200 degrees F.
Brine comp.=20% NaCl
Oil/water=1/19
Corrosives=saturated $CO_2$

TABLE III

| Test Cond. | Sample No. | Ave. weight loss (mg) | Test Cond. | Sample No. | Ave. weight loss (mg) |
|---|---|---|---|---|---|
| AA | blank | 36 | BB | blank | 33 |
|  | 1 | 10 |  | 1 | 4 |
|  | 3 | 6 |  | 3 | 3 |
|  | 6 | 10 |  | 6 | 5 |
|  | 11 | 6 |  | 11 | 4 |
|  | 17 | 4 |  | 12 | 8 |
|  | 21 | 6 |  | 17 | 3 |
|  | 22 | 7 |  | 21 | 6 |
|  | 36 | 13 |  | 22 | 7 |
|  | 37 | 7 |  | 24 | 5 |
|  | 38 | 10 |  | 27 | 6 |
| AA | 39 | 6 | BB | 28 | 6 |
|  | 43 | 10 |  | 36 | 3 |
|  |  |  |  | 27 | 6 |
| CC | blank | 33 |  | 28 | 6 |
|  | 11 | 6 |  | 36 | 3 |
|  | 36 | 6 |  | 37 | 4 |
|  | 38 | 8 |  | 38 | 4 |
|  | 39 | 5 |  | 39 | 4 |
|  |  |  |  | 40 | 4 |
| DD | blank | 44 |  | 43 | 6 |
|  | 1 | 12 |  | 71 | 10 |
|  | 3 | 4 |  | 72 | 8 |
|  | 6 | 7 |  | 73 | 8 |
|  | 11 | 10 |  | 74 | 8 |
|  | 17 | 7 |  | 78 | 6 |
|  | 21 | 7 |  | 79 | 5 |
|  | 36 | 7 |  | 80 | 8 |
|  | 37 | 7 |  | 87 | 4 |
|  | 38 | 6 |  | 89 | 6 |
|  | 39 | 4 |  |  |  |
| EE | blank | 34 | FF | blank | 104 |
|  | 1 | 10 |  | 1 | 48 |
|  | 3 | 4 |  | 3 | 16 |
|  | 6 | 5 |  | 6 | 16 |
|  | 11 | 5 |  | 11 | 32 |
|  | 17 | 5 |  | 17 | 16 |
|  | 21 | 5 |  | 21 | 10 |
|  | 36 | 6 |  | 22 | 10 |
|  | 37 | 5 |  | 36 | 10 |
|  | 38 | 5 |  | 37 | 16 |

TABLE III-continued

| Test Cond. | Sample No. | Ave. weight loss (mg) | Test Cond. | Sample No. | Ave. weight loss (mg) |
|---|---|---|---|---|---|
|  | 39 | 4 |  | 38 | 16 |
|  |  |  |  | 39 | 10 |
|  |  |  |  | 43 | 10 |
| GG | blank | 56 | HH | blank | 77 |
|  | 1 | 5 |  | 11 | 36 |
|  | 3 | 2 |  | 36 | 22 |
|  | 6 | 2 |  | 38 | 30 |
|  | 11 | 2 |  | 39 | 28 |
|  | 12 | 16 |  |  |  |
|  | 17 | 2 |  |  |  |
|  | 21 | 2 |  |  |  |
|  | 22 | 4 |  |  |  |
|  | 24 | 6 |  |  |  |
|  | 27 | 10 |  |  |  |
|  | 28 | 11 |  |  |  |
|  | 35 | 10 |  |  |  |
|  | 36 | 2 |  |  |  |
|  | 37 | 3 |  |  |  |
|  | 38 | 2 |  |  |  |
|  | 39 | 2 |  |  |  |
|  | 43 | 30 |  |  |  |
|  | 40 | 7 |  |  |  |
|  | 71 | 11 |  |  |  |
|  | 72 | 13 |  |  |  |
|  | 73 | 9 |  |  |  |
|  | 74 | 14 |  |  |  |
|  | 78 | 13 |  |  |  |
|  | 79 | 13 |  |  |  |
|  | 80 | 13 |  |  |  |
|  | 87 | 13 |  |  |  |
|  | 89 | 12 |  |  |  |

The above tests demonstrate the effectiveness of a variety of compositions under a variety of test conditions. It again is emphasized that these materials and tests are only representative. As will be appreciated by those skilled in the art, variations and modifications of the materials exemplified above may be made without departing from the scope of the invention as hereinafter claimed.

What is claimed is:

1. A method of treating well fluid stream containing a corrosive compound to reduce corrosion of metal equipment contacted by the stream which comprises introducing in the stream from 1 to 1000 ppm based on the combined weight of the stream and the corrosive compound of a corrosion inhibitor consisting essentially of the reaction product of
   (a) from 0.5 to 3.0 moles of a carbonyl compound selected from the group consisting of aldehydes and ketones;
   (b) from 0.5 to 3.0 moles of an alkyl amine; and
   (c) from 0.5 to 3.0 moles of an ammonium thiocyanate, said reaction product being formed in an aromatic solvent.

2. The method of claim 1 wherein the compound (a) is an aldehyde having from 1 to 18 carbon atoms.

3. The method of claim 2 wherein the aldehyde is an alkyl aldehyde.

4. The method of claim 1 wherein the amine has the following formula

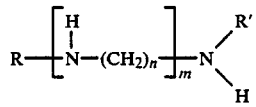

where R and R' are each H or $C_1$ to $C_{18}$ alkyl or aryl group; n is 2 or 3; and m is 0 to 4.

5. The method of claim 4 wherein R or R' is H and the other is a $C_1$ to $C_{18}$ alkyl or aryl group.

6. The method of claim 4 wherein the amine is a monoamine having the following formula $$R-NH_2$$

where R is a $C_1$ to $C_{18}$ alkyl group,

7. The method of claims 1, wherein the reaction product is prepared by first reacting an aldehyde with an amine and the reaction product thereof is then reacted with a thiocyanate.

8. The method of claim 1, wherein (a), (b) and (c) are reacted simultaneously.

9. The method of claim 1 wherein the mole ratio of (a):(b):(c) ranges from 0.5-3.0:0.5-3.0:0.5-3.0.

10. A method of treating a petroleum stream containing a corrosive compound to reduce corrosion of metal equipment contacted by the stream which comprises introducing in the petroleum stream from 1 to 1000 ppm based on the combined weight of petroleum and the corrosive compound of a corrosion inhibitor consisting essentially of the reaction product of
  (a) from 0.5 to 3.0 moles of a $C_1$ to $C_{18}$ aldehyde;
  (b) from 0.5 to 3.0 moles of an alkyl amine; and
  (c) from 0.5 to 3.0 moles of an ammonium thiocyanate, said reaction product being formed in an aromatic solvent.

11. The method of claim 10 wherein the aldehyde is selected from the group consisting of formaldehyde, propionaldehyde and butyraldehyde and the alkyl amine is selected from the group consisting of mono and polyamines of $C_2-C_{18}$ alkyls, tallow, coco, and oleyl.

12. The method of claim 11 wherein the corrosion inhibitor is introduced into the stream having a temperature of 250° F. and above.

13. The method of claim 10 wherein the corrosive compounds are selected from the group consisting of brine, hydrogen sulfide, carbon dioxide, and mixtures of these.

14. The method of claim 10 wherein the mole ratio of (a):(b):(c) ranges from 1-2:1-2:1-2.

* * * * *